Oct. 11, 1960   F. JACKEL   2,955,481
ELASTIC GEAR- AND SPROCKET WHEELS
Filed March 24, 1958
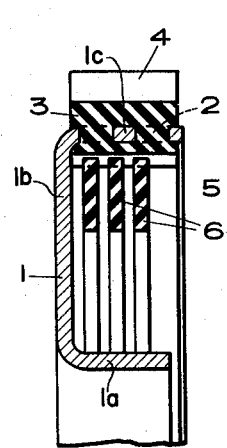
FIGURE I
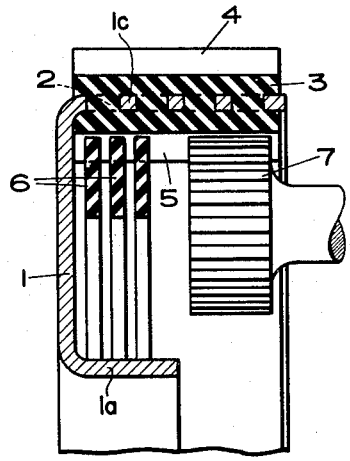
FIGURE II
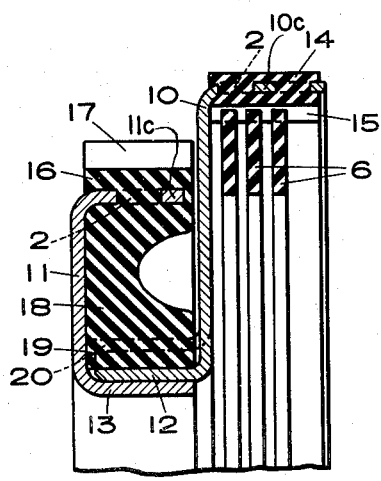
FIGURE III

United States Patent Office 2,955,481
Patented Oct. 11, 1960

2,955,481

ELASTIC GEAR- AND SPROCKET WHEELS

Fritz Jackel, Bielefeld, Germany, assignor to Lemforder Metallwaren G.m.b.H., a corporation of Germany Filed Mar. 24, 1958, Ser. No. 723,161

Claims priority, application Germany Mar. 22, 1957

10 Claims. (Cl. 74—438)

This invention relates to gear and sprocket wheels comprising a metallic center part or hub element and a rim part or teeth element made of an elastic material.

Gear and sprocket wheels comprising a metallic hub element and an elastic teeth element are known in the art. In the gear and sprocket wheels of conventional construction, the elastic rim part is fastened to the metallic center part by means of bolts or rivets or, if made of a castable material, cast around the metallic center part. While the first construction is time consuming and expensive, casting, as heretofore practiced, does not result in a solid connection between the hub element and the rim element.

It is an object of the present invention to provide elastic gear and sprocket wheels that can be made in a simple and inexpensive manner. Another object of the present invention is to provide elastic gear and sprocket wheels in which the elastic rim part or teeth element is firmly anchored in the metallic center part or hub element. A further object is to provide gear and sprocket wheels which run smoothly and noiselessly. A further object is to provide a gear wheel having on its rim a set of exterior teeth as well as a set of interior teeth, both sets of teeth being adapted to receive or supply motion by engaging the teeth of other gear wheels. A further object is to provide a gear wheel adapted to form a part of a disc clutch of the type used on motorcycles, the exterior or interior teeth of said gear wheel engaging the discs or lamellae of the clutch. Still further objects will become apparent from the following description with reference to the accompanying drawing which illustrate certain preferred gear and sprocket wheels made in accordance with and embodying this invention.

In the drawing:

Figure I is a fragmentary sectional view of one embodiment of the present invention.

Figure II is a fragmentary sectional view of another embodiment of the present invention.

Figure III is a fragmentary sectional view of a third embodiment of the present invention.

In accordance with this invention, generally speaking, the foregoing objects and others are accomplished by providing gear and sprocket wheels comprising a central metallic member and an elastic teeth element forming exterior and/or interior projections, i.e. teeth or sprockets, said central metallic member being drum-shaped and said teeth element being made of an elastic, abrasion-resistant material, such as polyurethane rubber, which is cast around said central metallic member and anchored in said central metallic member through holes in the circumference thereof.

Referring more particularly to the drawing, the gear wheel represented in Figure I comprises the drum-shaped central metallic member 1 which may consist of drawn stainless steel sheet metal, cast iron or wrought iron. Central metallic member 1 has a hub portion 1a, a wall portion 1b, and a rim portion 1c. Rim portion 1c of the central metallic member 1 is provided with the holes 2. Due to the holes 2, the teeth element 3, which is cast around the central metallic member 1, is firmly anchored in the latter. A material which is particularly well suited for making the elastic teeth element 3 is polyurethane rubber known under the tradename "Vulkollan." The elastic teeth element 3, which extends over the whole width of the rim portion 1c of central metallic member 1, forms two sets of teeth, i.e. the exterior teeth 4 and the interior teeth 5.

If the gear wheel illustrated in Figure I is a part of a disc clutch as used on motorcycles, the exterior teeth may engage with a power supply pinion (not shown in Figure I), while the interior teeth 5 may mesh with the discs or lamellae 6.

The use of the gear wheels of this invention in disc clutches results in several advantages. In the first place, the so-called disc or lamellae rattling, i.e. rattling of the discs in the clutch, is eliminated. In the second place, it is possible to give the clutch an advantageous, flat shape. Furthermore, clutches containing the gear wheels of this invention run noiselessly and have a long service life.

The embodiment of the invention shown in Figure II is similar to that illustrated in Figure I. However, the rim portion 1c, provided with the anchor holes 2, and the elastic teeth element 3 are wider with the result that the interior teeth 5 can engage with the discs or lamellae 6 and at the same time with one or more pinions 7 which receive or supply motion.

The embodiment of the invention illustrated in Figure III is representative of a clutch element in which, for structural reasons, the elastic drive wheel and the discs are of different sizes. This clutch element is characterized by having a particularly high torsional elasticity.

As may be seen from Figure III, the central metallic member of this embodiment of the present invention consists of two drum-shaped members 10 and 11 which are arranged in such a manner as to be capable of rotating within each other with the drum walls or outer hubs 12 and 13 parallel to each other. Drum 10 has the elastic teeth element 14 cast around its rim portion 10c. Teeth element 14 forms the interior teeth 15 which mesh with the discs (lamellae) 6. Drum 11 is surrounded by the elastic teeth element 16 which form the exterior teeth 17 intended to receive motion.

The power transmission from drum 11, which receives the motion to drum 10, is effected by the voluminous, torsion-elastic transmitting element 18 consisting of the same elastic material as the circumferential casting 16 which forms the outer teeth 17. The transmitting element 18 is connected with the circumferential casting 16 through the holes 2 arranged in the rim portion 11c of the drum 11. The transmitting element 18 has on its interior circumference the teeth 19 which engage with the teeth 20 on outer hub 12. The interior teeth 19 as well as the teeth 20 are preferably wave-shaped.

The elastic teeth element of the gear and sprocket wheels of the present invention may be made of any suitable material. Materials that combine elasticity with abrasion resistance are preferred materials of construction for this part. A particularly suitable elastic material is cast polyurethane rubber made by processes that are known per se (see for example U.S. Patents 2,620,516; 2,621,166; 2,729,618; 2,764,565 and 2,778,810). The following example describes a procedure to make a polyurethane rubber of the required elasticity and hardness by at first preparing a liquid reactive mixture comprising an isocyanate modified polyester and a cross-linking agent, casting this mixture in a suitable mold and bringing about cross-linking and formation of solid polyurethane rubber by heating. It is to be understood, however, that any other suitable formulation for making polyurethane rubber may also be utilized.

*Example*

1,000 parts by weight of an hydroxyl polyester obtained by thermal esterification of about 11 mols of adipic acid with about 12 mols of ethylene glycol and having an hydroxyl number of about 52 and an acid number of about 1 are heated at a temperature of about 135° C. and under a vacuum of about 12 mm. until the formation of bubbles has stopped and the polyester is completely free from water. Now, 400 parts by weight of naphthylene-1,5-diisocyanate are added at 135° C. while stirring. As soon as the temperature starts to drop, 110 parts by weight of butylene glycol-1,4 are stirred into the mixture at about 135° C. The resulting mixture is poured into a mold and maintained therein at a temperature of about 110° C. for about 24 hours to form a polyurethane rubber having the following characteristics:

| | | |
|---|---|---|
| Tensile strength | kg./cm.$^2$ | 350 |
| Elongation at break | percent | 500 |
| Permanent set | do | 12 |
| Tear resistance | kg./cm.$^2$ | 96 |
| Resiliency | | 39 |
| Load at 300% elongation | | 86 |
| Shore hardness | degree | 95–97 |

While certain representative embodiments and details have been shown for the purpose of illustrating this invention, it will be apparent to those skilled in this art that various changes and modifications may be made therein without departing from the spirit and the scope of the invention.

What is claimed is:

1. An elastic gear wheel comprising a central metallic member including a cylindrical rim formed with anchor holes extending through said rim and an elastic abrasion-resistant material cast around said rim, said elastic material having exterior teeth formed thereon, and having a portion of the material extending through said anchor holes to the inside of said rim, said portion inside said rim having interior teeth formed thereon.

2. The gear wheel of claim 1 wherein said elastic material is composed of polyurethane rubber.

3. The gear wheel of claim 1 wherein said elastic material extends over the entire width of the cylindrical rim of the central metallic member.

4. The gear wheel of claim 3 which is part of a disc clutch and wherein the exterior teeth are adapted to engage with a power-supplying pinion and the interior teeth are adapted to mesh with the discs of said clutch.

5. The gear wheel of claim 3 wherein the elastic teeth element and the central metallic member are sufficiently wide to allow the interior teeth to engage with clutch discs and simultaneously with a power receiving element.

6. The gear wheel of claim 3 wherein the elastic teeth element and central metallic member are sufficiently wide to allow the interior teeth to engage with clutch discs and simultaneously with a power-supplying element.

7. The elastic gear wheel of claim 1 wherein the central metallic member comprises two drum-shaped members positioned to rotate within each other and each having an outer wall parallel to the other.

8. The elastic gear wheel of claim 7 wherein one drum shaped member has a first elastic element cast around its rim and anchored thereto, said first element having interior teeth formed thereon which are adapted to mesh with clutch discs, and the other drum shaped member has a second elastic element cast around its rim and anchored thereto, said second elastic element having exterior teeth formed thereon which are adapted to receive motion.

9. The elastic gear wheel of claim 8 wherein said other drum-shaped member contains a voluminous torsion-elastic transmitting member having interior teeth, said transmitting member being anchored to said elastic element through anchor holes extending through said other drum-shaped member.

10. The elastic gear wheel of claim 9 wherein all of said interior teeth are wave-shaped.

References Cited in the file of this patent

UNITED STATES PATENTS

| | | |
|---|---|---|
| 284,290 | Gilliland | Sept. 4, 1883 |
| 680,654 | Gomber | Aug. 13, 1901 |
| 1,352,125 | Harrah | Sept. 7, 1920 |
| 2,064,435 | Loeffler | Dec. 15, 1936 |
| 2,111,590 | Hoof | Mar. 22, 1938 |
| 2,198,008 | Tknayan | Apr. 23, 1940 |
| 2,827,796 | Erickson | Mar. 25, 1958 |
| 2,839,942 | Le Van | June 24, 1958 |

FOREIGN PATENTS

| | | |
|---|---|---|
| 481,657 | Italy | June 6, 1953 |